United States Patent

[11] 3,626,072

[72] Inventors: Georgi Alexandrov Haralampiev;
Nicola Pentchev Shopov; Ivan Dimitrov Entchev; Kiril Metodiev Balevski; Bolyarka Stefanova Balkandjieva, all of Plovdiv, Bulgaria
[21] Appl. No.: 24,570
[22] Filed: Apr. 1, 1970
[45] Patented: Dec. 7, 1971
[73] Assignee: Nautchno-Izsledovatelski Institut PO Tzvetna Metalurgia Plovdiv, Bulgaria
[32] Priority: Feb. 27, 1967
[33] Bulgaria
[31] I-261

Continuation-in-part of application Ser. No. 708,247, Feb. 26, 1968, now abandoned. This application Apr. 1, 1970, Ser. No. 24,570

[54] METHOD AND A DEVICE FOR CONTINUOUS SLAGGING OF ELECTRIC AND REVERBERATORY FURNACES, OPERATING WITH A DEEP SLAG BASIN
8 Claims, 2 Drawing Figs.

[52] U.S. Cl. .................................................. 13/9, 13/33, 164/52
[51] Int. Cl. .................................................. F27d 3/15
[50] Field of Search ........................................ 13/9, 33, 29; 164/252, 52

[56] References Cited
UNITED STATES PATENTS

| 772,354 | 10/1904 | Harmet | 13/33 X |
| 1,335,009 | 3/1920 | Moore | 164/252 X |
| 2,310,635 | 2/1943 | Hopkins | 164/252 X |
| 2,587,727 | 3/1952 | Horswell et al. | 13/29 |
| 3,234,608 | 2/1966 | Peras | 13/9 ES |

Primary Examiner—Bernard A. Gilheany
Assistant Examiner—R. N. Envall, Jr.
Attorney—Arthur O. Klein ABSTRACT: A method and a device for continuously removing slag from electric and reverberatory furnaces having deep slag basins, which are used for melting ores, concentrates, roasting residues and agglomerates of nonferrous metals. An inclined channel passes through the furnace wall, and the lower end of the channel is located inside the furnace at the depth of the quiet slag layer, while the outer outgoing end is at the level of the slag surface inside the furnace and is located on the outer side of the furnace. The slag is removed from the slag basin through this channel, running off through it with a velocity of flow lower than 10 cm./sec. The runoff of the slag from the depth of the quiet layer, combined with the low velocity of outflow through the inclined channel and the slow motion of the slag upwards—in a direction opposite the action of the sedimentation forces of gravity, provides a reduction of the loss of metal with the slags. The constant level of the slag inside the furnace stabilizes the thermal conditions of the furnace. The low velocity of flow of the slag through the inclined channel and the invariable thermal loading of the refractories reduces the wear of the latter.

INVENTORS:
GEORGI ALEXANDROV HARALAMPIEV
NICOLA PENTCHEV SHOPOV
IVAN DIMITROV ENTCHEV
KIRIL METODIEV BALEVSKI
BOLYARKA STEFANOVA BALKANDJIEVA

BY:
ATTORNEY

METHOD AND A DEVICE FOR CONTINUOUS SLAGGING OF ELECTRIC AND REVERBERATORY FURNACES, OPERATING WITH A DEEP SLAG BASIN

This application is a continuation-in-part of application Ser. No. 708,247, filed Feb. 26, 1968, now abandoned.

BACKGROUND OF THE INVENTION

This invention relates to a method and a device for continuously removing slag from electric and reverberatory furnaces, which have deep slag basins, and are used for melting ores, concentrates, roasting residues and agglomerates of nonferrous metals.

The hitherto known methods for periodically slagging furnaces having a deep slag basin, utilize holes through which the slag runs off with a velocity of flow considerably exceeding 20 cm./sec. The periodical slagging is connected with a number of disadvantages. As it is known, the slag contains drops of matte and metal with a size from several microns up to hundreds of microns. Due to their greater specific weight, these drops precipitate at a greater or lower speed depending on their sizes. In slagging, the velocity in the direction of flow and the velocity in the direction of precipitation are superimposed. At a high flow velocity of the slag, as a result of this addition of velocities, a larger number and greater matte drops are entrained outside the furnace. This leads to an increase in matte and metal losses with the slag, and represents one of the basic disadvantages of periodical slagging with high outlet flow velocities.

The method of periodically slagging leads to fluctuations of the slag level inside the furnace, and hence creates variable thermal conditions for the refractory lining of the furnace, while in electric furnaces the electric conditions, the electrode control, and the voltage and the wattage are changing. This is another disadvantage of periodically slagging.

The method of periodically slagging leads to a sharply varying thermal loading of the refractories in the area of the outlet hole. Furthermore, the great velocity of flow of the slag through the hole leads also to mechanical wear of the refractories. Therefore, periodically slagging requires frequent repairs of the refractory materials in the area of the slag outlet holes, and even of relining, which is connected with expenditures for materials and labor.

The method of periodically slagging requires the frequent repetition of manual operations, which do not lend themselves to mechanization and automation. These operations comprise the opening and closing of the outlet hole and other auxiliary functions which are carried out under strenuous working conditions, such as high temperature, evaporation and burning hazards.

The combination of said disadvantages of periodically slagging can cause damages, as for example, a discharging of the whole melt of the furnace.

There are also known methods for continuously slagging wherein the slag runs off successively through a number of holes, i.e. for each single hole the slagging is carried out periodically, but for the entire furnace the slagging is carried out continuously using the holes alternately. All of the aforedescribed known methods have the aforementioned shortcomings of operating with periodic slagging.

There are also known methods for continuous slagging of electric and reverberatory furnaces, wherein the slag is overflowing directly from its top level with a velocity of flow which is determined by the charging velocity. The overflow of the slag from its top level leads to increased losses of metal, because nonmelted charge particles are floating on the slag surface, and furthermore, the drops of matte in the surface layer are very small and they have had no time to precipitate through this top layer.

In the known devices for continuously slagging in the aforementioned furnaces, there are overflow channels located at the slag surface level. These overflow channels are provided with open runners which are inclined towards the furnace bed. Such a structural arrangement, as well as the method wherein the slag overflows directly from its top level, leads to great losses of metal due to the aforementioned reasons. Furthermore, these known devices for continuous slagging are provided with cooling boxes, which complicate the construction and create accident hazards for operating personnel.

SUMMARY OF THE INVENTION

The method for continuous slagging of electric and reverberatory furnaces, in accordance with the present invention, differs from the known methods in that the slag is run off from depth of the slag basin, i.e. from the quiet slag layer were the processes of slag forming are completed and the increase in size of the matte drops has progressed. This quiet layer of slag is located in the electric furnaces beneath the depth of immersion of the electrodes, and in the reverberatory furnaces beneath the depth of immersion of the unmolten charge swimming on the surface of the slag. The velocity of flow of the slag is lower than 10 cm./sec. The removal of the slag from a predetermined depth of the slag basin is carried out by means of the principle of communicating vessels.

It is, therefore, a general object of the present invention to provide a slagging method and device of the aforedescribed character which avoids the drawbacks of the known devices.

BRIEF DESCRIPTION OF THE DRAWINGS

The invention is illustrated by way of examples in the accompanying drawings which form part of this application and in which.

DESCRIPTION OF THE PREFERRED EMBODIMENTS

Figure 1:
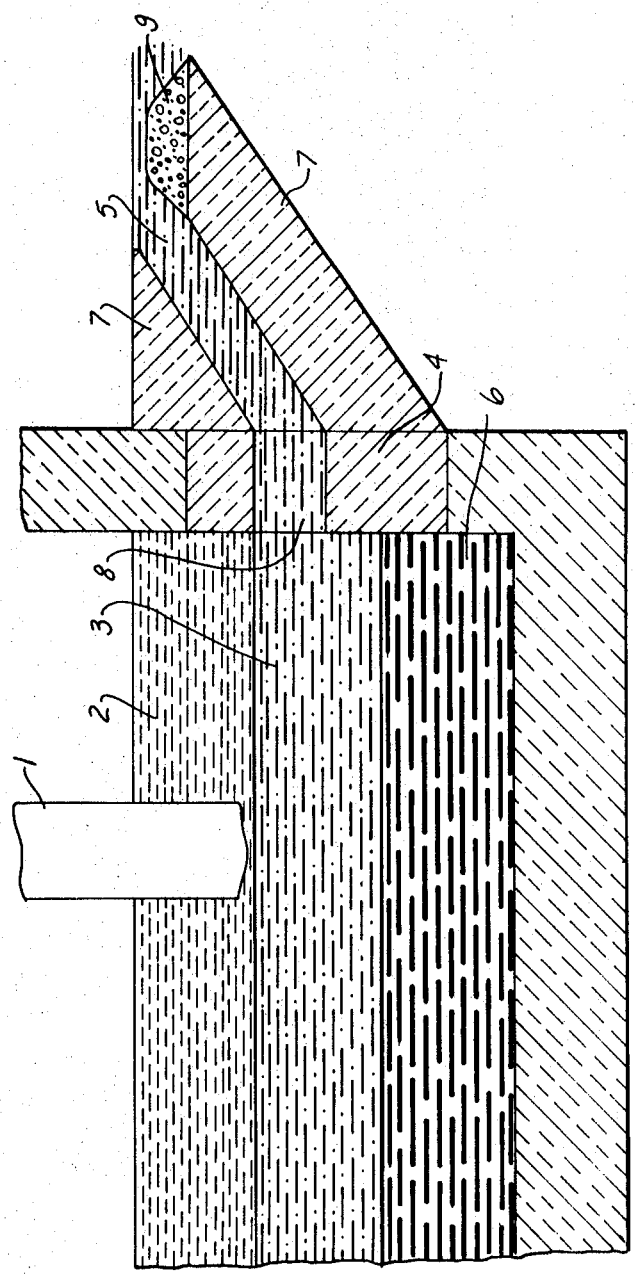
FIG. 1 illustrates schematically in cross section a part of an electric furnace constructed in accordance with the invention.

In the furnace of FIG. 1 there is shown an electric furnace having a plurality of electrodes (one shown at 1) which are immersed in the slag layer 2, wherein an intensive convective motion takes place under the action of the heat emitted by the electric current flowing between electrodes in this layer. The layer 3 beneath the electrodes is free of convective motions in the depth where the slag channel 5 is shaped in the bed wall of the furnace 4. The layer of matte 6 precipitated from the slag lies beneath the quiet layer 3. The walls 7 of the channel 5 are made of slag corrosionproof refractory material of the type of corundum, graphite, etc. The electrodes 1 may be of either the consumable or nonconsumable type.

In the device shown in FIG. 1, the closed channel 5 is built up in the furnace wall or secured to the furnace wall; channel 7 is inclined in an upward direction from the aperture 8 in the bed wall of the furnace, located at the level of said quiet layer 3 of the slag, toward the slag top level. The cross section of the inclined channel is dimensioned in such a way, that the velocity of flow of the slag is lower than 10 cm./sec.

Figure 2:
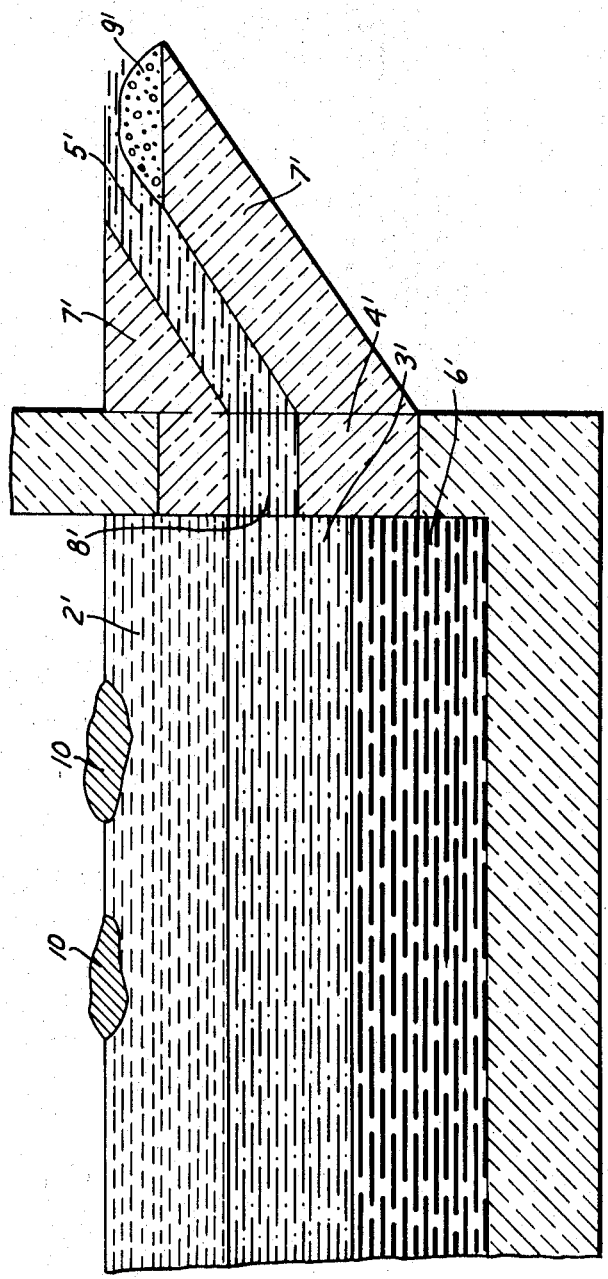
FIG. 2 illustrates schematically in cross section a part of a reverberatory furnace constructed in accordance with the invention.

In FIG. 2 there is shown a reverberatory furnace constructed in accordance with the invention. Parts in FIG. 2 which are similar to parts in FIG. 1 are designated by the same reference characters with an added prime. The channel 5' is made of slag corrosionproof refractories 7'; channel 5' inclines upwardly from its entrance port 8' in the bed wall of the furnace at the level of the quiet layer 3' between the upper layer of slag 2' and the matte layer 6'. Parts 10 of a solid charge are shown floating on the upper layer of slag 2'.

In the embodiments of this device shown in both FIGS. 1 and 2, the device is built up from slag corrosionproof refractory materials, for example, cast corundum, graphite and the like and, consequently, it does not require water or air cooling. Another advantageous feature of the device in accordance with this invention is that on the upper end of the channel 5 (5'), there is provided a supplementary dam 9 (9'), which is formed by tamping a refractory mass. On the one hand, said dam increases to an additional degree the safety in furnace operation by minimizing the danger of a discharge of the whole melt of the furnace and, on the other hand, it offers the possibility of controlling the slag level, by lowering or raising its overall height.

The advantage of the disclosed method and device lies in that the slag is run off from the depth of the slag basin, where it is generally assumed that the processes of slag-forming are completed, and where the bulging processes of the drops of matte have well advanced and the velocity of flow through said channel is lower than 10 cm./sec., as a result of which the probability of carrying forward drops of matte or metal together with the outflowing slag in this zone is minimized. Another advantageous feature of the device of this invention lies in that the slag moves slowly upwards in said channel in a direction opposite to the action of the sedimentation forces, and as a result even the matte drops entrained with the slag move downwards while the slag moves upwards. The aforementioned process results in a reduction of the content of matte, and of metal respectively, in the slag.

Another advantageous feature of the device of this invention lies in the possibility to find an optimum depth for the run off of the slag from the slag basin, by means of a simple change in the height of the overflow dam, which in practice determines the level of the slag inside the furnace.

This optimum depth is in all cases in the layer below the depth of immersion of the electrodes, if the invention is applied to electric furnaces, and in the layer below the depth of immersion of the unmolten charge, if the invention is applied to reverberatory furnaces. This layer is the so-called quiet layer of slag, because there are no markedly expressed convective or other motions which may hinder the sedimentation of matte drops towards the bed of the furnace.

The low linear velocity of flow of the slag prevents rapid wear of the refractory materials which are used for making the furnace wall around the inclined channel and the walls of the inclined channel itself.

The construction of the device in accordance with this invention, wherein the channel is inclined in a direction from the aperture in the bed wall of the furnace, said aperture being located on the level of the quiet layer of the slag, toward the slag top level, results in a longer furnace zone of sedimentation. This, in turn, gives rise to the possibility that the metal drops subsequently precipitate and return to the surface.

The construction of the device, according to this invention, with slag corrosionproof refractory materials, eliminates the necessity of air or water cooling, thus bringing security and safety in operation and decreasing the thermal losses.

The present invention thus avoids to a pronounced degree all of the shortcomings in the electric and reverberatory furnaces having deep slag basins.

Due to the decrease of the thermal losses, which results from the use of slag corrosion refractory materials, the method of this invention for continuous slagging may also be used in furnaces having a small production of slag.

The method and device of this invention also improve the sanitary and hygienic conditions of labor.

During operation tests of the method and device of the invention, data have been compared for the copper content of the slag and for the size of the matte drops entrained mechanically with the slag, which were obtained with continuous and periodical slagging. It has been established, that the copper content of the slag in the case of continuous slagging according to the invention is 15 to 20 percent lower than in the case of periodical slagging.

It has been established that 95 to 99 percent of the mechanically entrained drops of matte in the case of periodical slagging are matte drops of a size of over 100 microns. In the slags obtained with continuous slagging such large drops of matte have not been found. The testing method used has been microscopic observation of polished sections of rapidly chilled slag samples.

The velocity of outflow of the slag through the inclined channel of the device for continuous slagging was 6 to 8 mm./sec.

While a specific embodiment of the invention has been shown and described in detail to illustrate the application of the inventive principles, it will be understood that the invention may be embodied otherwise without departing from such principles.

We claim:

1. A method of continuously removing slag from a furnace having a deep slag basin, said basin containing a lower bath of molten matte and an upper molten slag bath, comprising creating intensive convective motion in an upper layer of the slag both by introducing heat into the slag bath from the top thereof while leaving the lower layer of the slag bath in contact with the upper portion of the matte bath in a quiet state, and continuously removing the slag from the furnace through a closed channel inclined upwardly from the level of the quiet layer of slag inside said furnace up to the surface level of the upper slag layer outside said furnace to control the level of the slag in the furnace, the flow of slag through the channel being conducted at a low velocity so that said matte is not carried off through the channel.

2. A method as set forth in claim 1, wherein said slag flows through the channel at a velocity not exceeding 10 cm./sec.

3. A method as set forth in claim 1, wherein the slag moves upward in said channel until the entrained drops of matte and metal sink down.

4. An improved construction in electric and reverberatory furnaces having deep slag basins, comprising a furnace having a bottom, vertical wall means extending from said bottom of the furnace, said vertical wall means having a covered upwardly inclined channel having a lower inlet and an upper outlet, said furnace being partially filled with an upper bath with molten slag and a lower bath of molten matte when in operation, the slag bath being divided into an upper slag layer and a lower slag layer, in the upper slag layer there being an intensive convective motion under the action of heat added to such layer in the furnace, the lower slag layer being quiet, said inlet being located at the level of the quiet lower layer of the slag, and said outlet being located at the level of the top surface of the slag bath, said covered inclined channel being filled with slag flowing through it at a low velocity of flow of the slag, determined by said channel, such that matte is not carried off through the channel.

5. An improved construction as set forth in claim 4, wherein the furnace is an electric furnace having a plurality of electrodes which are immersed in the upper slag layer but terminate short of the upper surface of the lower slag layer, and comprising electric current supply means connected to the electrodes, said intensive convective motion in the upper slag layer taking place under the action of the heat emitted by the electric current flowing between the electrodes in such upper layer.

6. An improved construction as set forth in claim 4, wherein the furnace is a reverberatory furnace, and wherein the lower end of the channel, within the furnace, has its upper wall lying beneath the level of the bottom of the solid charge floating on the slag in the furnace.

7. An improved construction as set forth in claim 4, including a dam formed of tamped refractory material disposed adjacent to said outlet, the top surface of said dam controlling the level at which the slag overflows from said furnace from a layer where the processes of slag forming and matte forming are completed.

8. An improved construction as set forth in claim 4, wherein the walls of said channel are made of slag corrosionproof refractory materials, selected from the group consisting of corundum, graphite, and a combination of them.

* * * * *